United States Patent [19]
Anderson

[11] Patent Number: 5,114,273
[45] Date of Patent: May 19, 1992

[54] OFFSHORE PLATFORM POLLUTION CONTAINMENT DEVICE

[76] Inventor: Ray C. Anderson, 7605 S. Quebec, Tulsa, Okla. 74136

[21] Appl. No.: 414,308

[22] Filed: Sep. 29, 1989

Related U.S. Application Data

[63] Continuation-in-part of Ser. No. 379,362, Jul. 13, 1989, abandoned.

[51] Int. Cl.$^5$ .............................................. E02B 17/00
[52] U.S. Cl. .......................................... 405/68; 405/60; 405/66
[58] Field of Search ............................... 405/60–66, 405/68, 70, 71, 72

[56] References Cited

U.S. PATENT DOCUMENTS

| | | |
|---|---|---|
| 3,230,967 | 1/1966 | Castro .............................. 405/60 X |
| 3,599,434 | 8/1971 | Missud ............................. 405/68 X |
| 4,365,912 | 12/1982 | Burns .................................. 405/60 |
| 4,373,834 | 2/1983 | Grace .................................. 405/60 |
| 4,643,612 | 2/1987 | Bergeron ............................. 405/60 |

Primary Examiner—Dennis L. Taylor
Attorney, Agent, or Firm—James L. Jackson

[57] ABSTRACT

A protective device installed to or around an offshore drilling platform for oil or gas and the device when in operation to encircle or enclose the platform with a floating containment device and attached oil containment curtain hanging from the device to the ocean floor. The pollution containment device to be submerged normally and activated to the surface when needed. This device will entrap offshore platform pollutants in a short amount of time with a minimum amount of effort and will maintain a clean environment. Other methods of offshore platform pollution containment devices are shown, including permanent non-moving oil pollution containment barriers and activated barriers that operate internally and externally of the oil platform to form an all encompassing barrier from the ocean floor to above the water surface to hold an oil spill to the platform area. Offshore drilling can be environmentally safe.

5 Claims, 5 Drawing Sheets

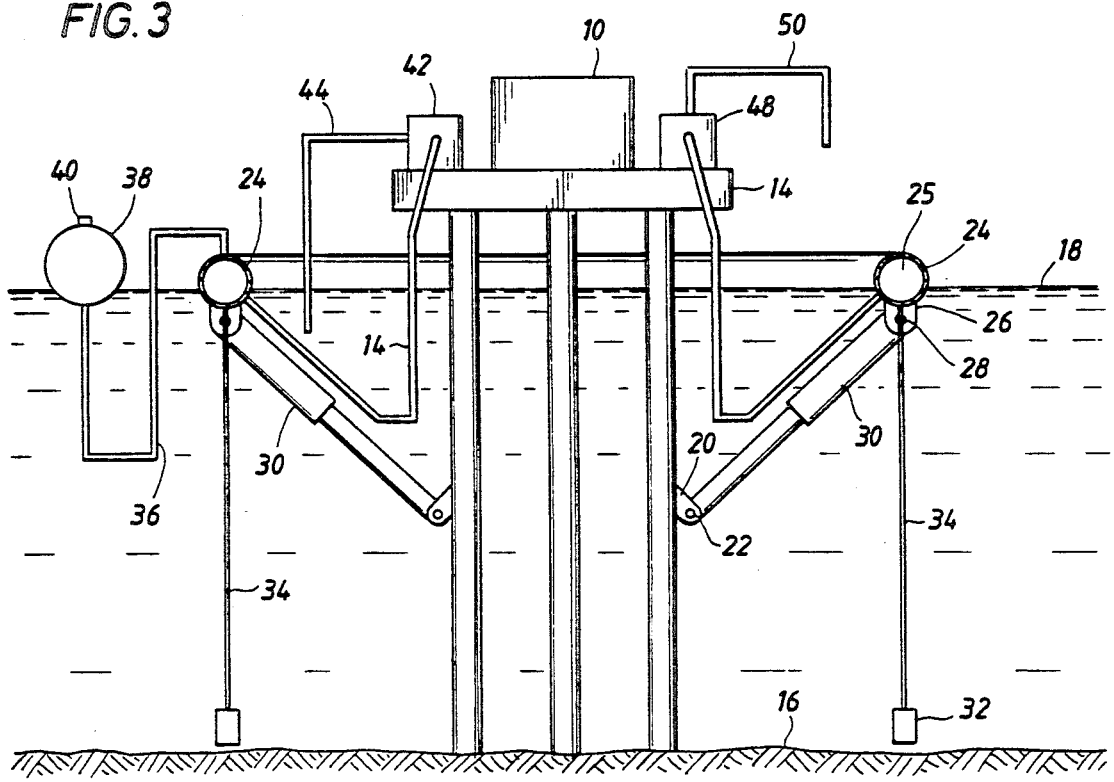
FIG. 3
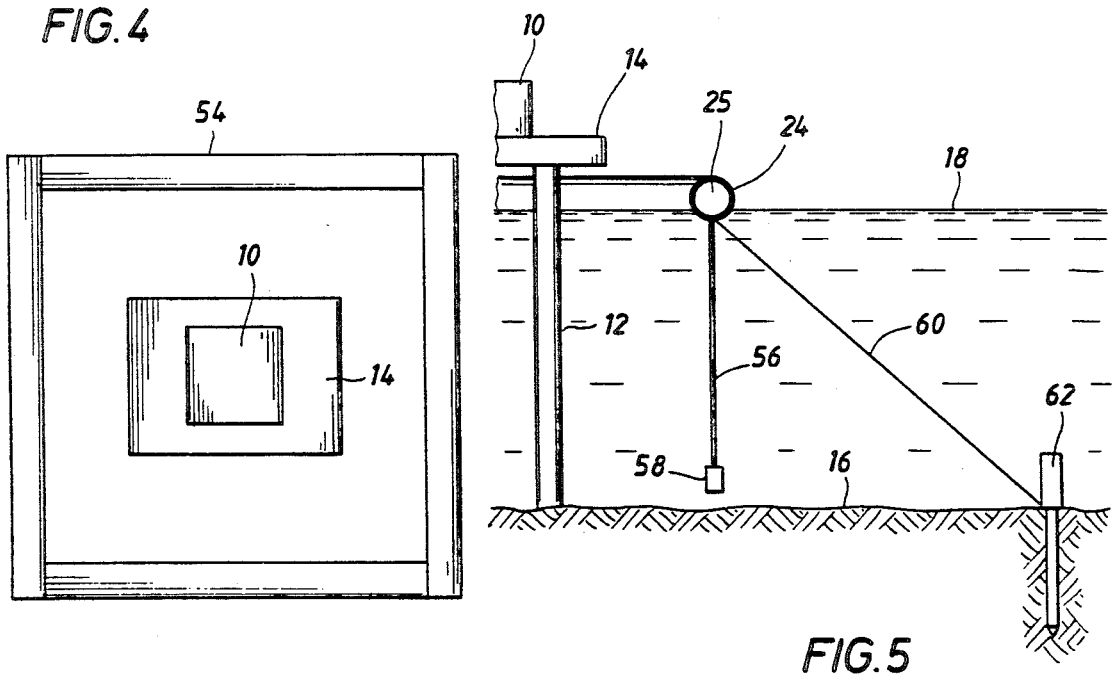
FIG. 4
FIG. 5

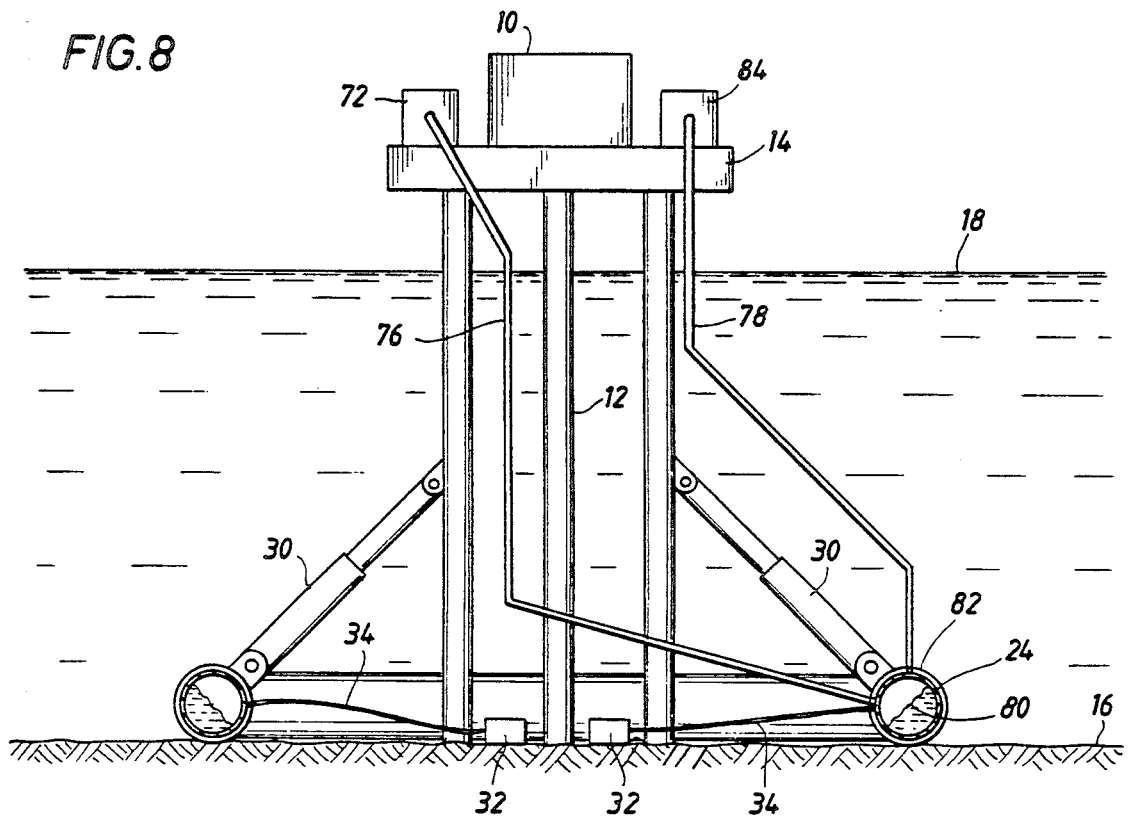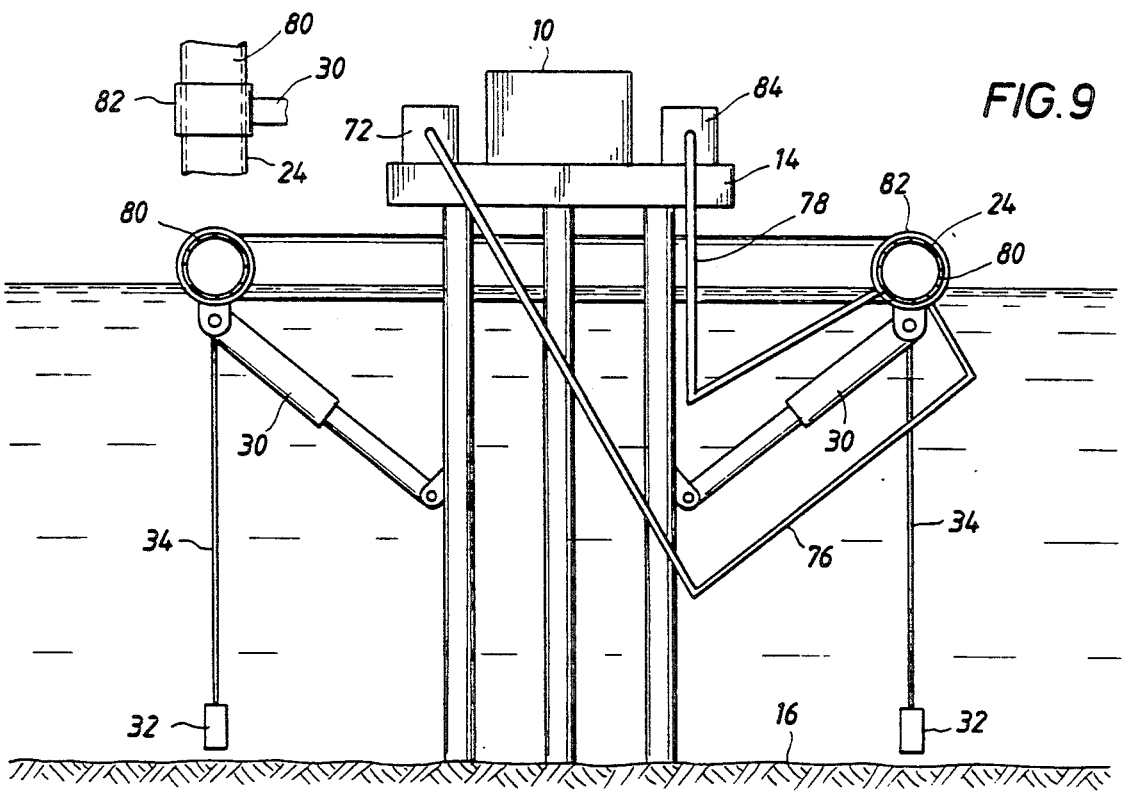

OFFSHORE PLATFORM POLLUTION CONTAINMENT DEVICE

This application is a continuation-in-part of U.S. patent application Ser. No. 07/379,362 filed Jul. 13, 1989, now abandoned by Ray C. Anderson and entitled, OFFSHORE PLATFORM POLLUTION CONTAINMENT DEVICE.

BACKGROUND OF THE INVENTION

The invention relates generally to offshore platforms for oil and gas drilling and more particularly to the containment of pollution to the general area of the platform. The term "offshore platforms" as used in this specification is intended to mean drilling, production and workover platforms which are utilized in oceans, lakes, marshes or any other bodies of water.

SUMMARY OF THE INVENTION

Offshore platforms now in use are normally anchored to the ocean floor with the surrounding water exposed and unprotected from oil seepage. When an oil spill occurs in the platform area, oil containment boom systems are deployed slowly with boating systems and usually are not efficient. The present invention protects the environment from massive oil spills spreading into the water by providing an oil containment system that is ready and waiting to be deployed when needed.

The oil containment flotation device is tubular and may be of circular, square or any other suitable configuration. It is preferably made of steel, plastic or any other material that is full circle or all-encompassing around the offshore platform. Attached to the buoyant tubular encompassing containment device is a flexible oil containment skirt hanging down to a sufficient depth to contain the oil. The tubular containment device is connected to the platform with limited telescoping arms or pivoting arms or the device is connected to pins inserted into the ocean floor. The telescoping arms dissipate or relieve any forces that might otherwise be transmitted from the containment device to the platform.

In normal operation the containment device is sunk or submerged to the ocean floor or to a level below the operating depth of ships, thus allowing the oil containment skirt to lie on or in close proximity to the sea bed. The buoyant tubular device of the oil containment system will lose its buoyancy and sink when water is pumped into the tubular platform encompassing flotation device using a pump provided on the platform. Alternatively, an electrically operated valve controlling a flow line attached to the tubular flotation device may be opened to allow water to flow naturally through the valve and fill the interior of the tubular device, thereby sinking the entire mechanism. Air escape hoses are provided to allow the air to escape inside the tubular device during the water filling operation. A vacuum pump is used in one application to evacuate and thus deflate a flexible tubular flotation device. By removing the air in this manner, the flotation device will lose its buoyancy and sink.

To raise the pollution containment devices due to an emergency oil pollution situation or any other cause or reason, the following methods are used. The tubular containment device when submerged by water inside the tube, can be raised by pumping the water out of the tube by means of a pump located on the oil production or drilling platform. As the water is replaced by air, the tubular section becomes buoyant and rises in the water until it emerges and floats at the water surface. The oil containment skirt attached to the tubular device is also raised upward and forms a protective barrier to contain the spilled oil. The tubular section floating on the water forms a protective barrier extending above the water surface to contain spilled oil at the surface.

Another embodiment of this invention may comprise a tubular platform encompassing a flotation device having an electrically operated valve in a drain line coupled to a holding tank located at the sea bed. The valve is normally open to the sea. The valve is closed to the sea and opened for gravity draining to the holding tank below. The tubular device and arms, stopped at a desired depth and not on the bottom, will gravity drain the water from inside the tubular device into the holding tank which is below the tube. Water entering the holding tank is pumped out of the tank and back into the sea by means of a pump located on the oil platform. As the tubular device gravity drains, the water is replaced by air provided through the air hoses thus permitting the tubular device and the attached containment skirts rise to the surface and form a platform encompassing oil containment structure that is capable of containing a large volume of leaked oil.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings:

FIG. 1 is a schematic top view of an oil platform incorporating a preferred embodiment of this invention including a circular tubular spill encompassing containment flotation device with telescoping arms attached to the tubular section and to the oil platform.

FIG. 2 is a schematic sectional front view of the oil platform and tubular spill containment apparatus with the tubular device filled with water and submerged.

FIG. 3 is a schematic sectional front view of an oil platform similar to that of FIG. 2, with the tubular spill containment device filled with air and floating on the surface and incorporating attached depending oil containment skirts for containing spilled oil.

FIG. 4 is a top view of an alternative embodiment of this invention showing a tubular spilled oil containment device of square configuration.

FIG. 5 is a partial side view of the oil platform showing the tubular oil containment device moored by cables connected to pins inserted into the ocean floor.

FIG. 6 is a schematic sectional front view of an oil platform having a tubular oil spill containment device representing a further alternative embodiment of this invention and being filled with water and submerged to a limited depth to allow for gravity draining of the tubular device.

FIG. 7 is a schematic sectional front view of the oil platform of FIG. 6 with the tubular oil spill containment device filled with air and floating on the surface.

FIG. 8 is a schematic sectional front view of an oil platform representing another embodiment of this invention with the flexible tubular oil spill containment device collapsed and submerged.

FIG. 9 is a schematic sectional front view of the oil platform of FIG. 8 with the attached circular tubular oil spill encompassing containment flotation device filled with compressed air and floating on the surface.

FIG. 10 is a schematic sectional front view representing another embodiment of this invention and showing an offshore oil platform with an oil spill encompassing and containment device in the upward position.

FIG. 11 is a schematic sectional front view of the oil platform apparatus of FIG. 10 with the oil spill encompassing containment device shown in the lowered position, fully surrounding the platform.

Figure 12:
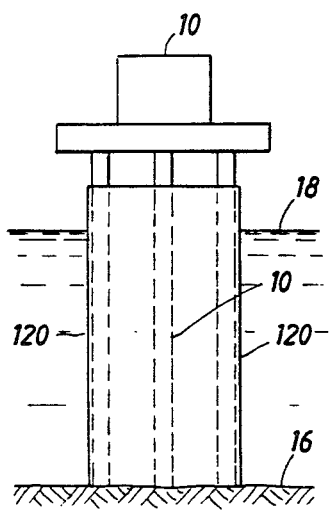

FIG. 12 is a front view of a further alternative embodiment showing an oil offshore platform having an attached oil spill encompassing containment device, fully surrounding the platform.

Figure 13:
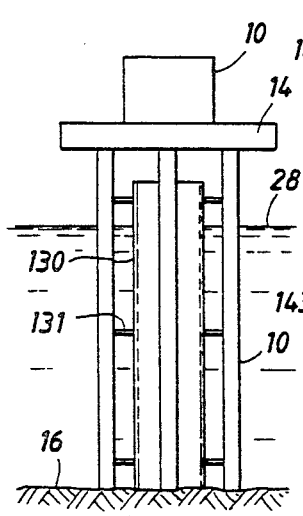

FIG. 13 is a front view of an oil offshore platform representing another embodiment and showing an internal platform encompassing oil spill containment device fully surrounding the working area of the drill stem.

Figure 14:
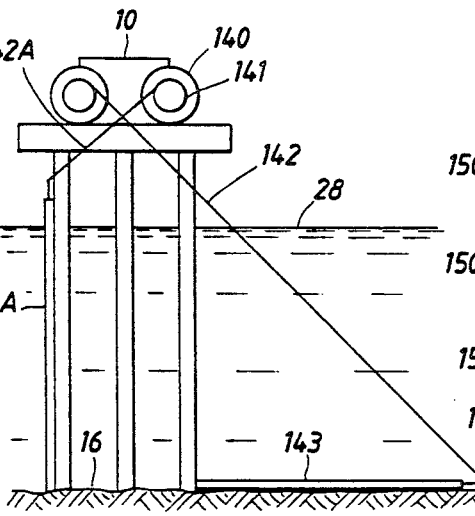

FIG. 14 is a schematic sectional front view of an oil offshore platform representing another embodiment showing hinged side covers operated by winches and cable and which are capable of assuming a position fully surrounding the legs of the platform.

Figure 15:
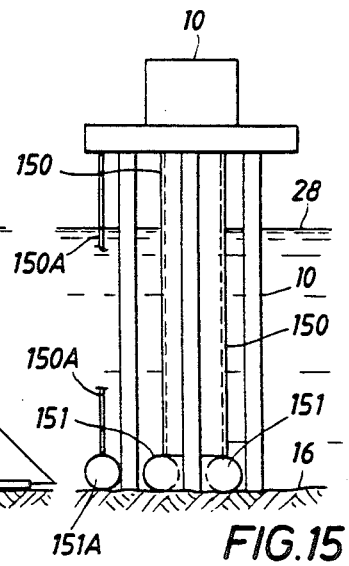

FIG. 15 is a front view of an oil platform representing another embodiment and showing an internal platform oil spill encompassing containment device capable of being lowered by gravity into a position fully surrounding the working area of the drill stem and capable of also including an external oil spill containment device if required.

Figure 16:
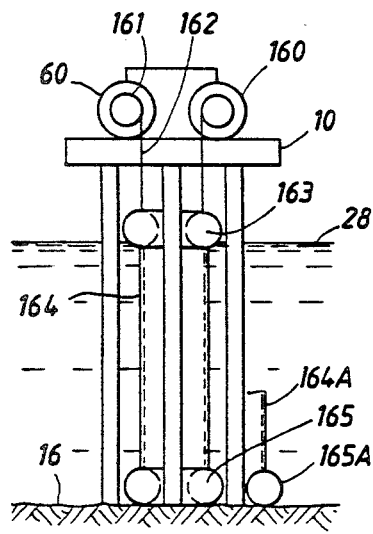

FIG. 16 is a schematic sectional front view of an oil offshore oil platform representing another embodiment provided with an internal oil spill encompassing containment device shown in the operating upward position operated by winches and cable and fully surrounding the drill stem working area and also capable of including an external oil spill containment device.

Figure 17:
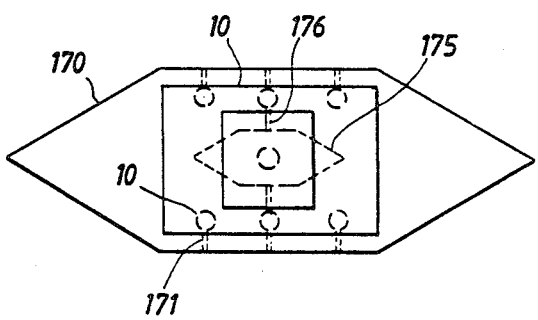

FIG. 17 is a top view of an offshore oil platform showing an attached oil spill encompassing pollution containment device fully surrounding the platform and shaped to minimize the forces developed on the containment device by waves or currents.

DESCRIPTION OF THE PREFERRED EMBODIMENT

Figure 1:
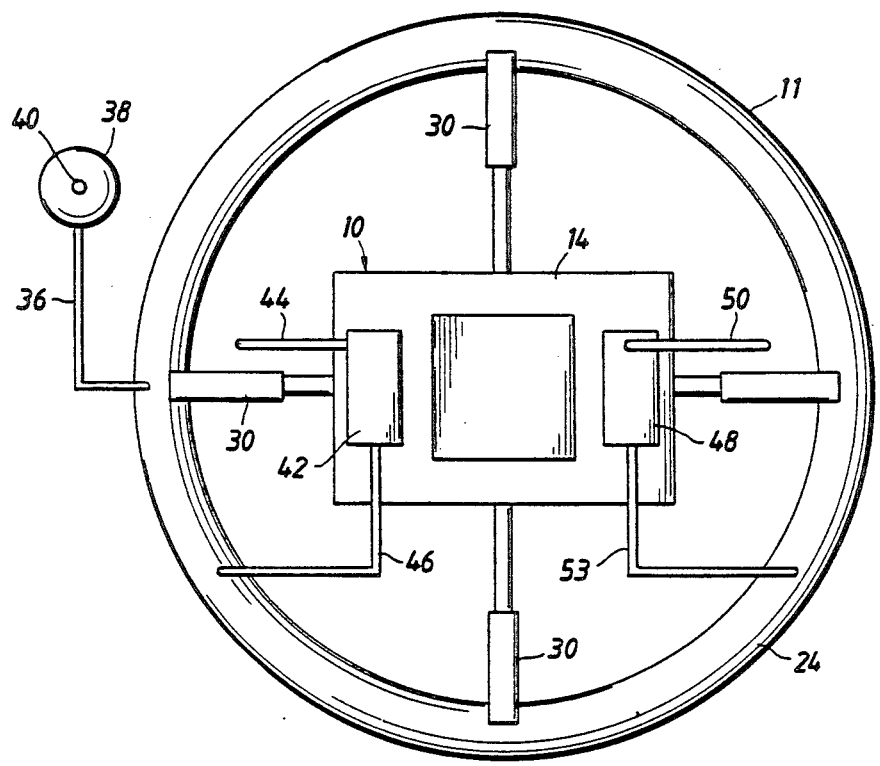
Figure 2:
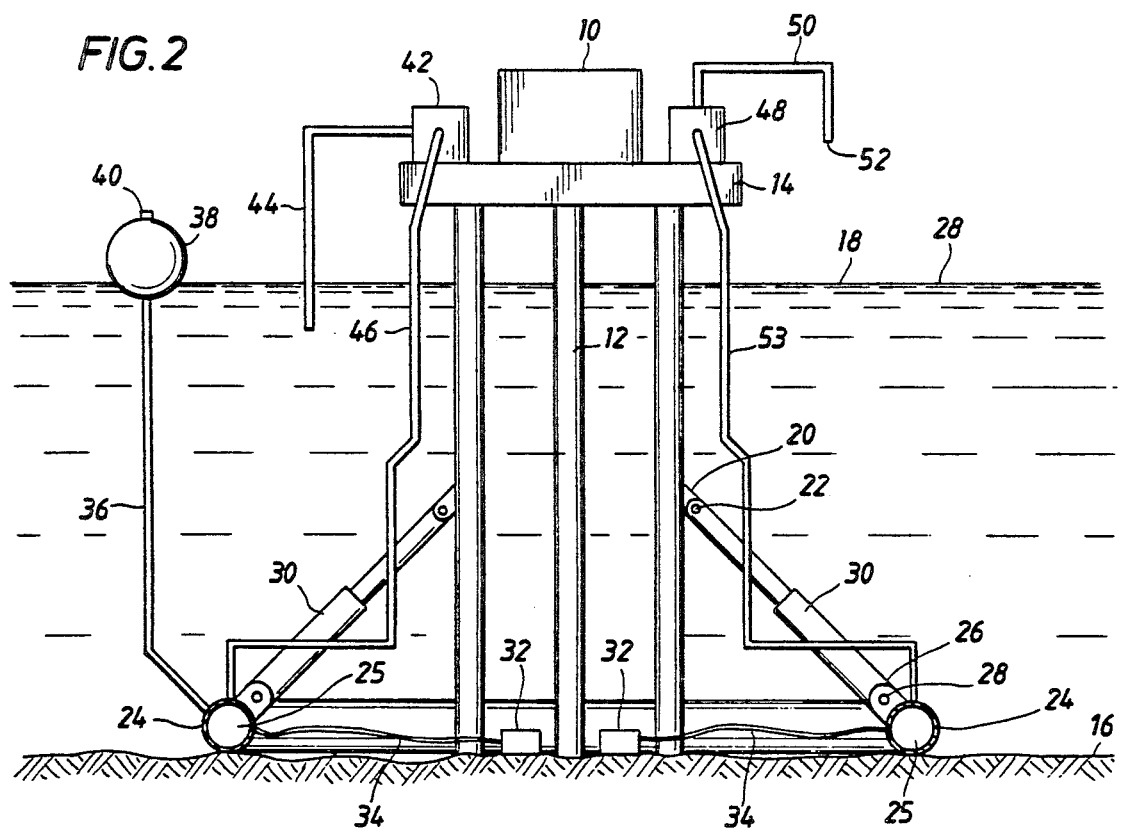

Referring now to the drawings and first to FIGS. 1 and 2, an offshore oil production or drilling platform is illustrated at 10 which incorporates a plurality of support legs 12 that extend from a platform base structure 14 to the sea bed 16 so as to support the base and other superstructure components of the platform above the level 18 of the ocean or other body of water as shown in FIG. 2.

A plurality of brackets 20 are fixed to the respective legs 12 of the platform and are provided with appropriate apertures for receiving respective connector swivel pins 22. A tubular flotation device 24 is shown in FIG. 2 as lying on the ocean floor 16 and is shown in FIG. 1 as being of circular configuration. It should be born in mind that the flotation device 24 may be of any desirable configuration such as rectangular, octagonal, etc. within the spirit and scope of the present invention so that it completely encompasses the platform or desired components of the platform. For example, the flotation device of FIG. 4 is shown to be of square configuration. It is necessary to achieve stationing of the tubular flotation device about the platform structure and to permit the device to have movement between an operative position where it is floating at the surface of the water and an inoperative position where it is submerged below the surface of the water. To accomplish this purpose a plurality of brackets 26 are fixed to the upper internal portion of the flotation device 24 as shown in FIG. 2 and are respectively provided with apertures for receiving swivel connector pins 28. A plurality of connecting telescoping arms 30 are respectively connected to the brackets 20 and 26 by means of the swivel connection pins 22 and 28. A plurality of weights 32 are positioned on the ocean floor 16 at a location inwardly of the respective platform legs 12. An oil containment skirt 34 has its inner periphery connected to the weights 32 while its external periphery is disposed in sealed connection with the inner periphery of the tubular flotation device 24.

The oil spill containment is deployed by controlling the buoyancy of the tubular flotation device. For this purpose an air line 36 is disposed in communication with the internal chamber of the flotation device 24 and has its upper end supported at the water level by means of a flotation ball 38. The upper end of the air line 36 is provided with an escape port 40 through which air is permitted to escape from the internal chamber 25 of the flotation device.

On the base structure 14 of the platform 10 is provided a first pump 42 having its inlet or suction line 44 extending below the platform and into the water. The pump includes a discharge line 46 which is disposed in communication with the internal chamber 25 of the flotation device. The connection of discharge line 46 to the flotation device 24 is located at the upper portion of the flotation device.

A second pump 48 is also supported by the base structure 14 of the offshore platform 10 and is provided with a drain pipe 50 having its drain opening 52 located above the water level 18. The pump 48 is provided with a drain line or hose 52 having its lower end in communication with the internal chamber 25 of the flotation device 24. The drain hose 53 is connected to the lower internal surface portion of the flotation device 24.

In operation, the internal chamber 25 of the rigid tubular flotation device 24 is filled with water by means of pump 42 which receives water from the ocean via the inlet pipe 44 and discharges the water through conduit 46 into the internal chamber 25 of the flotation device 24. During filling of the chamber 25 with water, air within the chamber will be vented via air line 36 and escape port 40 at the upper portion of the flotation ball 38. After sufficient air has been displaced from the chamber 25 by the water pumped therein, the rigid flotation device 24 will lose its buoyancy and will sink to the ocean floor level 16 as shown in FIG. 2.

With reference now to FIG. 3, for containment of spilled oil to the immediate vicinity of the offshore platform the flotation device 24 is shown to be raised by air to an operative position the surface level 18 of the ocean thereby allowing the circular oil containment skirt 34 to be vertically suspended from the flotation device 24 and to be stabilized by the weights 32. In this condition, the flotation device 24 and the circular skirt 34 present an effective containment device which protects the environment. In the event an oil leak occurs in the platform area and the oil could otherwise disperse in the water to the shoreline. To contain the spilled oil the flotation device 24 and its circular skirt 34 will be activated from the inoperative FIG. 2 position to the operative FIG. 3 position. To control the oil spill situation and raise the submerged tubular flotation device 24, the pump 16 is energized which will drain water from the tubular device 24 upwardly through suction drain hose 53 and drain pipe 50 by pumping water from chamber 25 upwardly through the suction drain hose and deischarging the pumped water through drawn pipe 50 and outlet opening 52 into the ocean. The water inside the tubular flotation device 24 is replaced by air through air escape port 40 and through air line 36. The tubular flotation device 24 will become buoyant and will rise from the ocean floor 16 to its operative position where it will float on the water surface 18. The attached oil containment skirt 34 will hang in a substantially vertical position held down and stabilized by weights 21 thus forming a continuous circular oil containment system about the platform.

The circular floatation device 24 is positioned about the offshore platform 10 by limited telescoping arms 30 that are attached to the respective brackets 20 and 26 with pivoting thereof being permitted by the pivot pins 22 and 28 which secure the telescoping arms to the platform legs and to the flotation device.

FIG. 4 is a plan view illustrating an offshore platform 10 that may be of similar construction as shown in FIGS. 1-3 and which is provided with a tubular flotation device 54 which is of square configuration. The tubular flotation device 54 may be of any suitable configuration so lone as it completely encompasses the offshore platform 10 so as to provide for effective containment of any oil that is spilled in the immediate vicinity of the platform. The tubular flotation device 54 will include a skirt similar to that shown at 34 in FIG. 3 and which is weighted in the same manner so as to depend vertically and provide a substantial oil spill containment system.

With reference to FIG. 5, the partial side view illustrates an offshore platform 10 having a tubular flotation device 24 that may be of the form shown in FIG. 2 or FIG. 4. The flotation device 24 is provided with a depending skirt 56 having weights 58 at the lower end thereof to maintain the skirt vertically oriented in the water. The weights in operative position will be located immediately above the ocean floor 16 and the flotation device 24 will be located at the surface 18 of the body of water. A plurality of cables 60 will be connected to the flotation device 24 and will be secured to the ocean floor at the lower ends thereof by means of a plurality of pins 62 that are inserted into the ocean floor 16 to a suitable depth for adequate retention. The cables 60 will maintain the tubular flotation device 24 at a properly stationary location about the offshore platform 10, thereby defining a large oil containment volume within the confines of the containment skirt 56.

Figure 6:
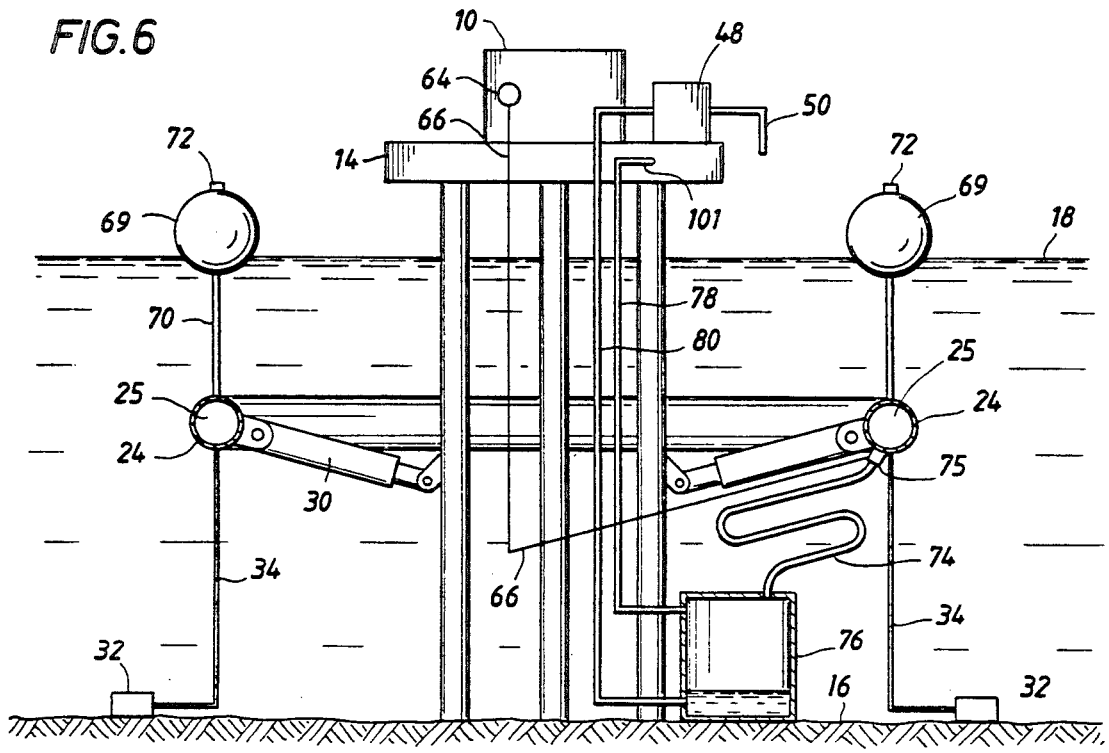
Figure 7:
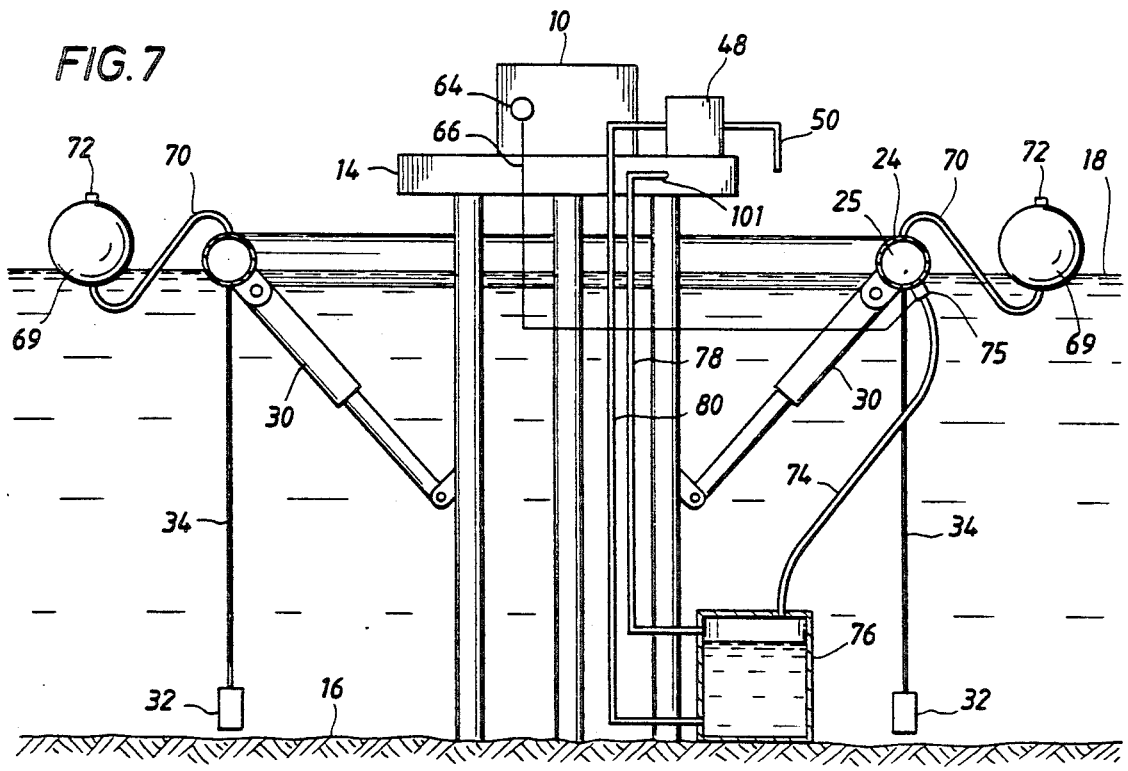

With reference now to FIG. 6, a sectional side view of an offshore platform system is shown which is provided with an oil spill containment system utilizing a gravity drain and fill method. In this case, the offshore oil platform structure and the flotation devices together with its pivotal stationing supports will conveniently take the form shown generally in FIGS. 1-3. Accordingly, like components will be referred to by like reference numerals. To submerge the unit as shown, a valve 75 is opened to the ocean water by switch 64 which controls the valve 75 through electrical line 66. Water will flow through opened valve 75 into the internal chamber 25 of the tubular flotation device 24, thus causing the flotation device to lose its buoyancy and sink until it is stopped intermediate the water surface 18 and the sea bed 16 by means of a plurality of flotation balls 69 which are attached to the flotation device by means of cables. The flotation balls 69 are attached to the tubular flotation device 2 by air line 78. As water fills the flotation device 24 the air escapes through the air line 78 and the air is vented at the escape port 72. To raise the tubular flotation device to the surface of the water to thereby contain any oil spill that might have occurred, as shown in FIG. 7, the electrical switch 64 is activated in the opposite direction to thereby close the electrically operated valve 75 to the ocean water and open the valve 75 to the drain hose 74. The water inside the tubular flotation device 24 will drain through valve 75, through drain hose 74 and into tank 76, aided by air line 78. The pump 48 will empty the holding tank 76 through drain line 80 and drain pipe 50 thus permitting air to be drawn into the flotation chamber 25 as the water is pumped out. The air being drawn into the flotation chamber enters through air escape port 72, flotation ball 69 and air line 70.

With reference to FIG. 8, a sectional side view of an offshore platform is shown, the platform being provided with an oil spill containment system utilizing a compressed air method for its operation. Here again, like parts will be referred to by like numerals. The construction of FIG. 7 differs from that of FIG. 6 in the provision of a vacuum pump 72 which is mounted on the platform base 14 and which are connected by vacuum lines 76 and 78 to the rigid flotation device 24 which, in this alternative embodiment, includes a continuous tubular collapsible flotation unit 80. To submerge the unit as shown, the vacuum pump 70 is energized thereby displacing air through the vacuum line 76 to thereby deflate the collapsible continuous circular tubular flotation device 80. A tubular support ring 82 is attached to the telescoping arm 30 and will support and position the collapsible tubular flotation unit 80. Although the flotation device 80 is shown to be of circular form, it should be born in mind that it may be of any configuration suitable to the needs of the platform about which it is to be disposed. To raise the flotation unit to the surface of the ocean and thereby provide for containment of an oil spil as shown in FIG. 9, an air compressor 84 is activated and forces air through supply line 78 to the collapsible tubular flotation unit 80 which will then be inflated with air. As the flotation device is inflated and displaces sufficient air to become buoyant, it will rise to the surface 18 of the ocean as shown in FIG. 9. In this position the flotation device will support the continuous platform encompassing skirt 34 which will be then suspended in substantially vertical manner from the flotation device 24. the weights 32 will apply a downwardly directed force to the skirt 34, causing it to assume a substantially vertical orientation so that it defines therein a significant volume within which to contain leaked oil. by means of the weights 32.

Figure 10:
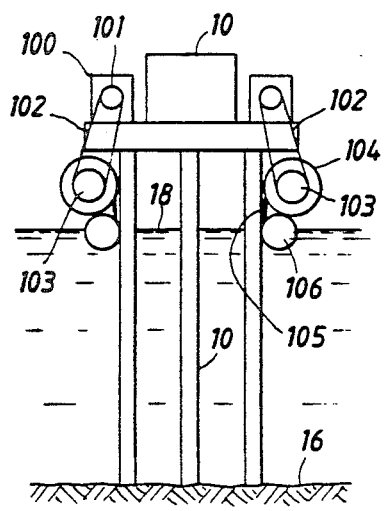
Figure 11:
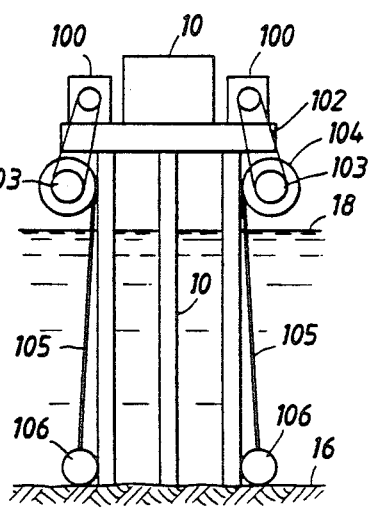

Further alternative embodiments of this invention are illustrated in FIGS. 10-17. With reference now to FIG. 10 a sectional front view of an oil platform 10 which is essentially of the construction set forth in FIGS. 1-9, wherein the ocean floor, is shown at 16 and the ocean surface is shown at 18. An oil containment skirt 105 is shown to be wrapped around a drum 14 and is shown in the upward position, being drawn up by motor 100 operating through drive sprocket 101, drive sprocket 103 and drive chain 102. A weight 106 is attached to the lower edge of the skirt 105 and is restrained from downward movement by the drive chain 102. To contain an oil spill to the platform area in the manner shown in FIG. 11, the motor 100 is reversed in such manner as to turn sprocket 101 and sprocket 103 together with drive chain 102 and drum 104 in a direction to lower the oil containment skirt 105 and weight 106. Containment is completed when the weight 106 reaches the ocean floor 16 as shown in FIG. 11. This system is provided on all four sides of the platform and forms an encompassing protective barrier to completely contain and hold an oil spill to the platform area until such time as the oil may be recovered by appropriate platform service vessels.

FIG. 12 is a front elevational view of an offshore oil platform 10 having an oil containment barrier defined by solid constructed sides 120 that are attached to platform 10 forming a continuous barrier on all four sides or completely around the platform to secure any spilled oil to the platform area. The barrier 120 extends from a level above the surface 18 of the water to the ocean floor 16.

As shown in FIG. 13 a front elevational view of an offshore oil platform illustrates an internal platform oil containment device 120 attached to the platform 10 by supports 131 and the device extending from the ocean floor 16 or the base 14 of the platform 10 to a level above the water surface 18. The oil containment barrier device 130 is of such shape as to form a continuous barrier. It may be of circular or square configuration to form an all encompassing barrier about the legs of the platform to hold in the oil spill to the platform area so that the oil may be recovered by vessels provided for that purpose.

FIG. 14 is a sectional front view of an offshore oil platform 10 illustrating hinged side covers 143 and 143A operated by winch 140, winch drum 141 and winch operating cable 142. A side cover 143 is shown in the open position lying on the ocean floor 16 with cable 142 extended. In operation, the side cover 143 is raised to the side cover position 143A with winch 140, drum 141 and cable 142A retracted. The side covers 143 are provided on all sides of the platform 10 and above the water surface 18 so as to form a continuous oil spill containment barrier to secure the oil spill to the immediate platform area.

FIG. 15 is a front elevational view of an offshore oil platform 10 showning an internal oil containment device in operation. The containment device descends downwardly by gravity to the ocean floor 16. The oil containment device is made up with skirt 150 attached to weight 151 and to platform 10. The device may also be positioned externally of the platform 10 as shown by weight 151A and skirt 150A. The device is of such a shape so as to form a continuous barrier, such as round or square, to form an all encompassing barrier to hold in the oil spilled to the immediate vicinity of the platform.

FIG. 16 is a sectional front view of an offshore oil platform 10 showing an internal oil containment device in operation and which is raised by which 160 and drum 161. Cable 162 is connected to the upper circular weight 165. The circular oil containment skirt 164 is attached to the upper circular weight 163 and is also attached to the lower circular weight 165 forming an all-encompassing barrier to hold in an oil spill to the immediate vicinity of the platform. Circular weight 165 is shwn on the ocean floor 16. The upper circular weight is shown in the raised position on the water surface 18. In the lowered position, the circular weight 163 would rest closed to circular weight 165. The device may also be located externally from the platform as shown by weight 165A and skirt 164A.

FIG. 17 is a top view of an offshore oil platform 10 showing an attached external encompassing pollution containment device 170 fully surrounding the platform and shaped to reduce the force against the platform 10 that may be caused by wave action and ocean currents. Encompassing oil barrier device 170 is attached to the platform 10 with attachments 171 and extends from the ocean floor 16 or the base of the platform 10 to a level above the ocean surface 18. This method forms an all encompassing barrier to hold in the oil spill to the platform area. Also shown in an internal encompassing oil spill containment device 175 with attachments 176 to platform 10 and shaped to reduce the force against the platform 10 caused by waves and currents. This device extends from the ocean floor 16 to level above the ocean surface 18. The devices 170 and 175 can be free standing, not attached to the platform 10 if desired, to thus reduce ocean induced stress to the platform 10.

In view of the foregoing, it is evident that the present invention is one well adapted to attain all of the objects and features hereinabove set forth, together, with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. An oil spill containment offshore platform system for use in a marine environment having a water surface and a sea bottom, said system containment for oil spills, comprises:
    (a) a rigid tubular flotation member being positioned in encompassing relation about said offshore platform and forming an internal chamber for selectively containing air and water for controlling the buoyancy thereof, said tubular flotation member being vertically movable and capable of assuming an operative position floating on the surface of the water and an inoperative position being submerged in the water;
    (b) means for stationing said tubular flotation member about said platform and controllably positioning said rigid tubular flotation member at both said operative and inoperative positions;
    (c) an oil containment skirt being connected to said tubular flotation member and extending downwardly from said tubular flotation member to form an open bottomed oil containing barrier about said offshore platform;
    (d) an drain pump mounted on said platform and having the suction thereof in communication with said internal chamber by pumping and being operative for discharging water from said internal chamber and thus controlling the buoyancy of said rigid tubular flotation member to selectively position said tubular flotation member at said opeative position;

(e) a fill pump mounted on said platform and having the discharge thereof in communication with said internal chamber and being operative to introduce water into said internal chamber for rendering said tubular flotation member non-buoyant to selectively position said tubular flotation member at said inoperative position; and (f) an air vent line being in communication with said internal chamber and having an escape port located above the surface of the water through which air is permitted to escape from said internal chamber when displaced by water being pumped into said internal chamber by said pump, said air vent line communicating air from said escape port into said internal chamber upon the pumping of water from said internal chamber by said drain pump.

2. The oil spill containment offshore platform system of claim 1, wherein said means for stationing comprises:
a plurality of telescoping arms each having one end thereof movably connected to said offshore platform and the opposite ends thereof connected to said tubular flotation member.

3. The oil spill containment offshore platform system of claim 2 wherein each of said arms is a telescoping arm and is pivotally connected respectively to said platform and to said tubular flotation member.

4. The oil spill containment offshore platform system of claim 1, wherein weight means is fixed to the lower end of said oil containment skirt means and insures support of said oil containment skirt means in substantially vertically oriented manner in said water.

5. The oil spill containment offshore platform system of claim 4, wherein said oil containment skirt means is flexible and is capable of lying on or adjacent to the sea bed and is further capable of being raised along with said tubular flotation member to define a substantially vertically oriented oil containment barrier extending to a considerable depth below the surface of the water.

* * * * *